United States Patent [19]

Greczyna et al.

[11] Patent Number: 5,510,169

[45] Date of Patent: Apr. 23, 1996

[54] MAGNETIC RECORDING MEDIUM WITH BACKSIDE COATING CONTAINING POLYMERIC PARTICLES

[75] Inventors: James A. Greczyna, Vadnais Heights; Chi-Ming Tseng, Woodbury, both of Minn.

[73] Assignee: Minnesota Mining and Manufacturing Company, St. Paul, Minn.

[21] Appl. No.: 323,393

[22] Filed: Oct. 14, 1994

[51] Int. Cl.$^6$ .................................................. G11B 5/00
[52] U.S. Cl. .......................... 428/147; 428/402; 428/522; 428/694 BB; 428/694 TB; 428/900
[58] Field of Search ..................................... 428/147, 402, 428/522, 694 BB, 694 TB, 900

[56] References Cited

U.S. PATENT DOCUMENTS

| | | | |
|---|---|---|---|
| 4,328,935 | 5/1982 | Steel | 242/192 |
| 4,414,270 | 11/1983 | Miyoshi et al. | 428/325 |
| 4,734,325 | 3/1988 | Ryoke et al. | 428/323 |
| 4,734,326 | 3/1988 | Nishimatsu et al. | 428/328 |
| 4,761,331 | 8/1988 | Ogino et al. | 428/323 |
| 4,770,932 | 9/1988 | Matsumoto et al. | 428/323 |
| 4,789,583 | 12/1988 | Akutsu | 428/143 |
| 4,798,755 | 1/1989 | Yamada et al. | 428/141 |
| 4,837,082 | 6/1989 | Harrell et al. | 428/329 |
| 4,871,606 | 10/1989 | Matsuura et al. | 428/147 |
| 4,912,009 | 3/1990 | Amering et al. | 430/137 |
| 4,952,650 | 8/1990 | Young et al. | 526/194 |
| 5,008,147 | 4/1991 | Ryoke et al. | 428/323 |
| 5,028,483 | 7/1991 | Chernega et al. | 428/329 |
| 5,081,213 | 1/1992 | Carlson | 528/73 |
| 5,185,423 | 2/1993 | Ohkubo et al. | 528/85 |
| 5,208,091 | 5/1993 | Yanagita et al. | 428/141 |
| 5,219,652 | 6/1993 | Shimasaki | 428/323 |
| 5,238,736 | 8/1993 | Tseng et al. | 428/327 |
| 5,306,538 | 4/1994 | Kurihara et al. | 428/141 |
| 5,310,595 | 5/1994 | Ali et al. | 428/206 |
| 5,346,761 | 9/1994 | Roller et al. | 428/331 |

FOREIGN PATENT DOCUMENTS

| | | |
|---|---|---|
| 0515902 | 12/1992 | European Pat. Off. |
| 60-121515 | 6/1985 | Japan. |
| 4-251427 | 9/1992 | Japan. |
| 5-282655 | 10/1993 | Japan. |
| 9320711 | 10/1973 | United Kingdom. |

OTHER PUBLICATIONS

R. Arshady, *J. Microencapsulation*, "Preparation of polymer nano- and microspheres by vinyl polymerization techniques," 5, 101(1988).

*Primary Examiner*—Stevan A. Resan
*Attorney, Agent, or Firm*—Gary L. Griswold; Walter N. Kirn; David B. Kagan

[57] ABSTRACT

Magnetic media having a backside coating containing polymeric acrylate particles are provided. The polymeric acrylate particles are prepared from about 50–98 parts by weight of at least one kind of polymerizable di(meth)acrylate monomer of the formula:

$$CH_2=CR^1C(O)O-X-O(O)CCR^1=CH_2$$

wherein each $R^1$ is independently H (for diacrylates) or $CH_3$ (for dimethacrylates) and X is a divalent branched or unbranched aliphatic or aromatic linking group; and about 2–50 parts by weight of at least one kind of polymerizable hydroxyl-containing monomer.

19 Claims, 1 Drawing Sheet

Fig. 1

MAGNETIC RECORDING MEDIUM WITH BACKSIDE COATING CONTAINING POLYMERIC PARTICLES

FIELD OF THE INVENTION

The present invention relates to magnetic recording media having a backside coating containing polymeric particles. Specifically, the particles are copolymers of di(meth)acrylate and hydroxyl-containing monomers, which impart a significantly low coefficient of friction to polymer films when coated thereon.

BACKGROUND OF THE INVENTION

Flexible magnetic recording media, such as audio and video magnetic recording tapes and computer cartridge tapes, include a magnetic recording layer supported on a nonmagnetic support. The quality of magnetically recorded and reproduced signals depends upon precise, accurate tracking of the magnetic recording media during transport (i.e., during playback, recording, fast forward, and rewind). Irregularities in tracking will generally adversely affect the recording and reproduction of magnetically recorded signals. Additionally, magnetic recording media should be relatively durable so that it is possible to record and play back information repeatedly. In view of these concerns, a backside coating can also be applied to the nonmagnetic support in order to improve the recording, reproduction, conductivity, durability, and tracking characteristics of the media. A backside coating typically includes a nonmagnetic pigment in a polymeric binder along with optional components such as lubricants, abrasives, thermal stabilizers, antioxidants, dispersants, wetting agents, antistatic agents, fungicides, bactericides, surfactants, coating aids, and the like.

One factor affecting tracking characteristics relates to the surface roughness of the backside coating. When the backside coating is too smooth, the coefficient of friction between the magnetic media and the guide surfaces of the recording/playback device increases. As a result, for example, variation in tension can occur at the time of winding, resulting in an irregular transport rate when the magnetic media is subsequently used. Also, with increased friction, air can get trapped under the magnetic recording medium and tape slippage can result. To avoid this and other problems that result from increased friction, the surface of the backside coatings are made with a rough texture to allow air to escape from under the moving tape.

This rough texture can be achieved by the addition of inorganic nonmagnetic particles to the backside coating. Such particles can improve running durability and diminish the lowering of a radio frequency output, for example. Examples of such inorganic particles include silicon dioxide, titanium oxide, zinc oxide, aluminum oxide, chromium oxide, silicon carbide, talc, kaolin, asbestos, mica, boron nitride, calcium carbide, zinc sulfide, and barium sulfate. Inorganic particles, however, are often inadequately bonded to the magnetic media, particularly if they are of an irregular shape and a wide particle size distribution. Furthermore, they can often be so hard that they can be too abrasive and can cause excessive wear to mechanisms in the recording/playback device. Also, if they are too large, they tend to press into the magnetic coating, leaving indentations in the magnetic coating when the medium is subsequently surface treated and/or stored as a roll or wound on a reel. As a result, those electromagnetic properties of the media that depend upon the smoothness of the magnetic coating, e.g., the signal to noise ratio, sensitivity, maximum output level, and the like, tend to deteriorate.

Organic powders have been shown to be useful alone or in combination with inorganic particles in magnetic media backside coatings. These include, for example, a benzoguanamine-type resin, a melamine resin, a phthalocyanine-type pigment, polymethylmethacrylate, carbon black, and graphite. For example, Kokai Patent Application No. SHO 60-121515 (Konishiroku Photo Co.) discloses the use of a powder of a benzoguanamine-type resin. This powder is said to reduce the coefficient of friction without increasing the surface roughness of the backside coating. See also, U.S. Pat. Nos. 5,208,091 (Yanagita et al.) and 4,734,325 (Ryoke et al.), and Kokai Patent Application No. HEI 4-251427 (Hitachi Maxell Co. Ltd.). European Patent Application No. 515,902 A1 (BASF Magnetics Ltd.) discloses a backside coating containing polyolefin spherical particles. These particles contribute to the mechanical stability, e.g., wear resistance and abrasion resistance, of the magnetic media and provide light transparency, which allows for use of the thermo-magnetic duplication process. Such organic particles are generally softer than inorganic particles; however, they can result in higher tape tension and a lack of durability of the backside coating if used as the only "roughness-causing" backside filler. Furthermore, organic particles are often inadequately bonded to the magnetic media.

To avoid undesirable omission of both organic particles and inorganic particles from the backside coating, surface treatments are used to strengthen the binding power between the particles and the binder resin(s). For example, U.S. Pat. No. 4,770,932 (Matsumoto et al.) discloses coating carbon black and titanium monoxide with an isocyanate compound. U.S. Pat. No. 5,219,652 (Shimasaki) discloses coating silicon dioxide particles and particles of a melamine formaldehyde condensation product, for example, with a fatty acid, preferably in combination with a silane or titanate coupling agent. There is still a need, however, for particles, particularly organic particles, that can be used in magnetic media backside coatings for improved performance without significant fallout.

SUMMARY OF THE INVENTION

The present invention is directed to a class of polymeric particles that impart surprising antifriction characteristics when coated on polymeric substrates, such as the nonmagnetic supports of magnetic recording media. These polymeric particles are advantageous because they can be used as a roughness-causing backside filler, i.e., texture-causing particles, preferably as the single roughness-causing backside filler, to improve the running properties of magnetic recording media. Preferably, these polymeric particles are used in combination with one or more nonmagnetic pigment, e.g., inorganic powders and carbon black, to also improve durability and conductivity of the coating. The running properties that are advantageously affected as a result of using the polymeric particles of the present invention in backside coatings include improved tape tension, improved air bleed properties, and improved cleanliness.

Thus, the present invention provides a magnetic recording medium comprising a support having two major surfaces, a magnetic layer provided on one major surface of the support, and a backside coating provided on the other major surface of the support, wherein the backside coating comprises nonmagnetic particles dispersed in a polymeric binder. The particles are copolymers derived from at least one kind of di(meth)acrylate monomer and at least one kind of hydroxyl-containing monomer, preferably a hydroxyl-containing (meth)acrylate monomer, and optionally other copolymerizable monomers. Surprisingly, the particles are very effective as antifriction agents when used in backside coatings of magnetic recording media. They are referred to herein as polymeric acrylate particles or simply polymeric particles. Preferably, the particles are the reaction product, i.e., copolymer, of about 50–98 parts by weight of at least one kind of polymerizable di(meth)acrylate monomer of the formula:

$$CH_2=CR^1C(O)O-X-O(O)CCR^1=CH_2$$

wherein each $R^1$ is independently H (for diacrylates) or $CH_3$ (for dimethacrylates), and X is a divalent branched or unbranched aliphatic or aromatic linking group, and about 2–50 parts by weight of at least one kind of polymerizable hydroxyl-containing monomer. As used herein, the parts by weight monomer are based on 100 parts of the total weight of di(meth)acrylate monomer and hydroxyl-containing monomer.

DETAILED DESCRIPTION OF THE INVENTION

The present invention is directed to magnetic recording media wherein a magnetic coating is supported on a nonmagnetic substrate, i.e., support, on which is coated a backside coating containing polymeric acrylate particles. The polymeric acrylate particles of the present invention are added to the backside coatings of magnetic media to improve their running and manufacturing properties. The polymeric acrylate particles of the present invention are generally insoluble, i.e., they do not swell, become sticky, or lose size or shape, in typical coating solvents such as tetrahydrofuran, toluene, cyclohexanone, methyl ethyl ketone, and the like. The particles are resilient such that they do not permanently deform under a pressure of about 2000 pounds per linear foot (pli) (929 psi, $4.5 \times 10^5$ Pascals). They are a reaction product of at least one kind of di(meth)acrylate monohomer (i.e., diacrylates and dimethacrylates) and at least one kind of hydroxyl-containing monohomer, preferably hydroxyl-containing meth(acrylate) monomer, and optionally other copolymerizable monomers. These particles are discussed in further detail below.

The nonmagnetic support can be any flexible substrate material known in the art. Examples of suitable substrate materials include, for example, polyesters such as polyethylene terephthalate ("PET"); polyolefins such as polypropylene; cellulose derivatives such as cellulose triacetate or cellulose diacetate; polycarbonates; polyimides; polyamides; polyacrylates; or any other suitable material. The thickness of the support may vary, but supports of thicknesses in the range of about 0.5–2.3 microns are generally suitable.

The particular magnetic coating used in the practice of the present invention is not critical. It can be any suitable magnetic coating known in the art. For example, the magnetic coating can be a thin film magnetic coating deposited onto the nonmagnetic support using various chemical and physical vapor deposition techniques. As another alternative, the magnetic coating can include magnetic pigment particles dispersed in a polymeric binder. Such pigments can be any suitable magnetic pigment known in the art. These include, but are not limited to:

magnetic iron oxides such as $\gamma$-$Fe_2O_3$, Co-containing $\gamma$-$Fe_2O_3$, $\gamma$-$Fe_3O_4$, Co-containing $\gamma$-$Fe_3O_4$; $CrO_2$; barium ferrites; or metal magnetic powder principally containing Fe, Ni, and Co, e.g., Fe—Ni—Co alloy, Fe—Ni alloy, Fe—Al alloy, Fe—Al—Zn alloy, Fe—Al—Ni—Co alloy, Fe—Al—Ni—Cr alloy, Fe—Al—Co—Cr alloy, Fe—CO—Ni—Cr alloy, Fe—Co—Ni—P alloy, and Co—Ni alloy. Generally, the magnetic coating contains one layer of magnetic material; however, the magnetic coating can include one or more separate layers of material.

The backside coatings of the present invention include polymeric acrylate particles dispersed in a binder. Any conventional binder known to be useful in the production of magnetic recording media can be used as a binder in backside coatings of the present invention. Preferred binders are for example, polymeric binders, or combinations of polymeric binders, known to be useful in the production of magnetic recording media and that can interact with the acrylate particles of the present invention. The polymeric acrylate particles of the present invention are particularly advantageous when used with a hydroxyl functional binder in combination with an isocyanate-containing crosslinker.

The amount of binder used can vary; however, it typically is used in an amount of about 30–60 parts by weight (pbw), preferably about 35–55 pbw, and more preferably about 35–42 pbw, based upon 100 parts of backside coating. The weight of the backside coating is based on the dried weight of the coating. Thus, in this context the weight of the backside coating includes, for example, the weight of the binder(s), polymeric acrylate particles, and any optional additives such as surfactant(s), antistatic agent(s), and the like, but excludes the weight of solvents used to facilitate coating.

Polymeric Acrylate Particles

The polymeric acrylate particles of the present invention are a reaction product of monomers comprising at least one kind of di(meth)acrylate monomer (i.e., diacrylates and dimethacrylates) and at least one kind of hydroxyl-containing monomer. The particles are generally spherical in shape, which inhibits or decreases the amount of agglomeration of particles. They can be any size which, when included in the backside coating of a magnetic recording medium, will improve the running properties of that magnetic recording medium. These particles generally have a mean particle size of about 0.5–5.0 µm, with the range of about 0.7–2.0 µm being preferred.

Typically, the di(meth)acrylate monomer is used in an amount of about 50–98 pbw, preferably about 60–95 pbw, and more preferably about 70–90 pbw. Typically, the hydroxyl-containing monomer is used in an amount of about 2–50 pbw, preferably about 5–40 pbw, and more preferably about 10–30 pbw. These values are based on 100 parts of the total amount of polymerizable di(meth)acrylate monomer and polymerizable hydroxyl-containing monomer.

Useful di(meth)acrylates (also referred to herein as the difunctional monomer) are those represented by the formula:

$$CH_2=CR^1C(O)O-X-O(O)CCR^1=CH_2$$

wherein each $R^1$ is independently H (for diacrylates) or $CH_3$ (for dimethacrylates) and X is a divalent branched or unbranched aliphatic or aromatic linking group. Preferably, X is $(CH_2)_n$ wherein "n" is an integer from 4 to 18, preferably 6 to 14. The term "di(meth)acrylate," also often referred to as "diol di(meth)acrylate," includes diacrylates and dimethacrylates.

Examples of suitable difunctional monomers include, but are not limited to, those selected from the group consisting of 1,4-butanediol diacrylate, 1,4-butanediol dimethacrylate, 1,6-hexanediol diacrylate, 1,6-hexanediol dimethacrylate, 1,8-octanediol diacrylate, 1,8-octanediol dimethacrylate, 1,10-decanediol diacrylate, 1,10-decanediol dimethacrylate, 1,12-dodecanediol diacrylate, 1,12-dodecanediol dimethacrylate, 1,14-tetradecanediol diacrylate, 1,14-tetradecanediol dimethacrylate, and mixtures thereof. Preferred such difunctional monomers include those selected from the group consisting of 1,4-butanediol diacrylate, 1,6-hexanediol diacrylate, 1,12-dodecanediol diacrylate, 1,14-tetradecanediol diacrylate, 1,4-butanediol dimethacrylate, 1,6-hexanediol dimethacrylate, 1,12-dodecanediol dimethacrylate, 1,14-tetradecanediol dimethacrylate, and mixtures thereof.

Useful hydroxyl containing monomers include hydroxyl-containing alkyl acrylates and methacrylates, caprolactone acrylates and methacrylates, hydroxyl-containing (meth)acrylamides (i.e., acrylamides and methacrylamides), hydroxyl-containing styrene derivatives, hydroxyl-containing vinyl ethers, hydroxyl-containing allyl ethers, poly(alkylene glycol)(meth)acrylates (i.e., acrylates and methacrylates), allyl alcohols, and mixtures thereof. Preferably, the hydroxyl-containing monomers are (meth)acrylates. Preferred examples of each of these classes of hydroxyl containing monomers are those with limited miscibility with water. In this context, "limited miscibility" means that the solubility of the monomers in water is less than about 10%. This level of miscibility is advantageous if suspension polymerization methods are used for preparing the polymeric microspheres.

Useful hydroxyl containing (meth)acrylates are represented by the formula:

$$CH_2=CR^2C(O)OR^3$$

wherein $R^2$ is H or $CH_3$ and $R^3$ represents a hydroxyl-containing moiety. Preferably, $R^3$ is a hydroxyl-substituted alkyl group containing 2–10 carbon atoms, which can be either branched or unbranched, and optionally substituted with one or more halogen atoms in addition to the hydroxyl substituent(s). It should be understood that $R^3$ can have more than one —OH group. Examples of suitable hydroxyl-containing (meth)acrylates include, but are not limited to, those selected from the group consisting of hydroxyalkyl (meth)acrylates wherein the alkyl moiety contains 2–7 carbon atoms, and 3-chloro-2-hydroxypropyl (meth)acrylate. Preferred such hydroxyl-containing monomers are those selected from the group consisting of 3-hydroxypropyl (meth)acrylate, 4-hydroxybutyl (meth)acrylate, 2-hydroxybutyl (meth)acrylate, 2-hydroxypropyl (meth)acrylate, and 5-hydroxypentyl (meth)acrylate.

Useful hydroxyl-containing caprolactone (meth)acrylates are represented by the formula:

$$CH_2=CR^4C(O)OCH_2CHR^5O\{C(O)(CH_2)_5O\}_mH$$

wherein $R^4$ and $R^5$ are each independently H or $CH_3$ and "m" is an integer from 1 to 10, preferably 2 to 4. Examples of suitable hydroxyl-containing caprolactone (meth)acrylates include ring opening addition products of ε-caprolactone with 2-hydroxyethyl (meth)acrylate or 2-hydroxypropyl (meth)acrylate. Such products are commercially available from Sartomer Co. of Exton, Pa., Union Carbide Corp. of Danbury, Conn. (under the tradename Tone M-100), and Daicel Chemical Industries, Ltd. of Japan (under the tradename PLACCELS FM1, FM2, FM3, FM4, FM7, and FM10).

Useful poly(alkylene glycol)(meth)acrylates are represented by the formula:

$$CH_2=CR^6C(O)O(C_2H_4O)_p(C_3H_7O)_qH$$

wherein $R^6$ is H or $CH_3$, "p" and "q" are integers such that p+q=2–15. Examples of suitable poly(alkylene glycol)(meth)acrylates include ring opening addition products of ethylene oxide and/or propylene oxide with (meth)acrylic acid. Such products are commercially available. Examples include diethylene glycol (meth)acrylate, triethylene glycol (meth)acrylate, and polyethylene glycol methacrylate, the latter of which is commercially available under the tradename of SIPOMER (HEM-5, HEM-10 and HEM-20), and polypropylene glycol methacrylate, which is available under the tradename of SIPOMER PPGMM (available from Rhone-Poulenc, Cranbury, N.J.). Preferred poly(alkylene glycol) (meth)acrylates are polypropylene glycol methacrylate and polypropylene glycol acrylate.

Useful hydroxyl-containing (meth)acrylamides are represented by the formula:

$$CH_2=CR^7CONR^8R^9$$

wherein $R^7$ is H, $CH_3$, or halogen; and $R^8$ and $R^9$ are each independently H, a cyclic, branched, or straight chain alkyl group containing 1–12 (preferably 1–8) carbon atoms, or a hydroxyl-substituted cyclic, branched, or straight chain alkyl group containing 1–12 (preferably 1–8) carbon atoms, with the proviso that at least one of $R^8$ or $R^9$ is a hydroxyl-substituted alkyl group. It should be understood that each of $R^8$ and $R^9$ could have more than one —OH substituent. Examples of suitable hydroxyl-containing (meth)acrylamides (i.e., methacrylamides and acrylamides) include N-(hydroxymethyl)(meth)acrylamide, N-(1-hydroxyethyl)(meth)acrylamide, N-(2-hydroxyethyl)(meth)acrylamide, N-methyl-N-(2-hydroxyethyl)(meth)acrylamide, N-(1-hexyl-2-hydroxy-1-methylethyl)(meth)acrylamide, N-propyl-N-(2-hydroxyethyl(meth)acrylamide, N-cyclohexyl-N-(2-hydroxypropyl)(meth)acrylamide, α-bromo-N(hydroxymethyl)acrylamide and α-chloro-N-(hydroxymethyl)acrylamide. Preferred hydroxyl-containing (meth)acrylamides are selected from the group consisting of N-methyl-N-(2-hydroxyethyl)(meth)acrylamide, N-(1-hexyl-2-hydroxy-1-methylethyl)(meth)acrylamide, N-propyl-N-(2-hydroxyethyl)(meth)acrylamide, and N-cyclohexyl-N-(2-hydroxypropyl)(meth)acrylamide.

Useful hydroxyl-containing styrene derivatives are represented by the formula:

$$CH=CH_2—R^{10}—OH$$

wherein $R^{10}$ is a substituted or unsubstituted benzene (e.g., —$C_6H_4$—) group or benzyl (e.g., —$C_6H_4$—$CH_2$—) group. The substituents on the benzene or benzyl groups can be groups that do not interfere with the polymerization process. Examples of such substituents include alkyl groups containing 1–4 carbon atoms, alkoxy groups containing 1–4 carbon atoms, nitro, and halogen atoms. Examples of suitable hydroxyl-containing styrene derivatives include hydroxymethyl styrene, 4-hydroxy-3-nitro-styrene, and 3-hydroxy-4-methoxy-styrene. A preferred hydroxyl-containing styrene derivative is hydroxymethyl styrene.

Useful allyl alcohols are represented by the formula:

$$CH_2=CR^{11}C(OH)R^{12}R^{13}$$

wherein $R^{11}$ is H, methyl, ethyl, or halogen; and $R^{12}$ and $R^{13}$ are each independently H, a cyclic, branched, or straight chain alkyl group containing 1–12 (preferably 1–6) carbon atoms, or phenyl. The alkyl groups can optionally be substituted with one or more halogen atoms. Examples of suitable allyl alcohols include allyl alcohol, 1-buten-3-ol, 1-penten-3-ol, 1-hexen-3-ol, 1-hydroxy-1-vinyl cyclohexane, 2bromoallyl alcohol, 2-chloroallyl alcohol, 2-methyl-1-buten-3-ol, 2-ethyl-1-penten-3-ol, and 1-phenyl-2-propen-1-ol. Preferred allyl alcohols are selected from the group consisting of 1-penten-3-ol, 1-hexen-3-ol, 1-hydroxy-1-vinyl cyclohexane, 2-methyl- 1-buten-3-ol, 2-ethyl-1-penten-3-ol, and 1-phenyl-2-propen-1-ol.

Useful hydroxyl-containing vinyl ethers are represented by the formula:

$$CH_2=CHOR^{14}$$

wherein $R^{14}$ is a hydroxyl-containing cyclic, branched, or straight chain alkyl group containing 1–12 (preferably 1–4) carbon atoms. Examples of suitable hydroxyl-containing vinyl ethers include hydroxyethyl vinyl ether and hydroxybutyl vinyl ethers. Preferred hydroxyl-containing vinyl ethers are 3-hydroxybutyl vinyl ether and 4-hydroxybutyl vinyl ether.

Useful hydroxyl-containing allyl ethers are represented by the formula:

$$CH_2=CHCH_2OR^{15}$$

wherein $R^{15}$ is a hydroxyl-containing cyclic, branched, or straight chain alkyl group containing 1–12 (preferably 1–4) carbon atoms, or a phenyl group. The alkyl groups can optionally be substituted with one or more halogen atoms. Examples of suitable hydroxyl-containing allyl ethers include allyl ethers wherein $R^{15}$ is hydroxyethyl, hydroxypropyl, chlorohydroxypropyl, methyl-hydroxyethyl and hydroxyphenyl. Preferred hydroxyl-containing allyl ethers are selected from the group consisting of allyl-1-methyl-2-hydroxyethyl ether, allyl-2-hydroxypropyl ether, allyl-2-hydroxy-1-phenyl ether, and allyl-2-hydroxy-2-phenyl ether.

The particles can also include one or more kind of polymerizable long-chain (meth)acrylate monomer and one or more kind of polymerizable ethylenically unsaturated monooomer. The long-chain monomer is added to impart lubricating properties. If used, an amount of about 5–30 pbw, preferably about 10–25 pbw, is useful. The parts by weight are based on 100 parts of the total weight of polymerizable di(meth)acrylate monomer and polymerizable hydroxyl-containing monomer. Preferred long-chain (meth)acrylate monomers are represented by the formula:

$$CH_2=CR^{16}C(O)OC_wH_{2w+1}$$

wherein $R^{16}$ is H or $CH_3$ and "w" is an integer from 12 to 40, preferably 12 to 18. Examples of such monomers include, but are not limited to, those selected from the group consisting of lauryl acrylate, lauryl methacrylate, octadecyl acrylate, octadecyl methacrylate, stearyl acrylate, stearyl methacrylate, and mixtures thereof. Stearyl methacrylate ($C_{16-18}$) and lauryl acrylate ($C_{12}$) are particularly useful because of their solubility and the lubricating properties they impart to the particles of the invention.

The ethylenically unsaturated monomer is added to impart higher strength or higher Tg's to the resulting polymeric particles, or to modify the degree of interaction between the coated particles and other materials which can be coated onto the support in addition to the particles of the present invention. If used, an amount of about 5–35 pbw, preferably about 10–25 pbw, is useful. The parts by weight are based on 100 parts of the total weight of polymerizable di(meth)acrylate monomer and polymerizable hydroxyl-containing monomer.

Preferred such monomers include, but are not limited to, those selected from the group consisting of vinyl esters such as vinyl acetate, vinyl propionate, and vinyl pivalate; acrylic esters such as methyl acrylate, cyclohexylacrylate, benzylacrylate, isobornyl acrylate, hydroxybutyl acrylate, and glycidyl acrylate; methacrylic esters such as methyl methacrylate, butyl methacrylate, cyclohexyl methacrylate, benzyl methacrylate, ethyl methacrylate, gamma-methacryloxypropyl trimethoxylsilane, and glycidyl methacrylate; styrene; vinyl toluene; alpha-methyl styrene, and mixtures thereof.

The polymeric acrylate particles of the present invention can be made using optional ingredients such as functional-group additives and free-radical thermal initiators. The functional-group additives are materials that contain functional groups that enhance bonding to the resin or the backing, e.g., polyester. Such additives are useful in modifying the degree of interaction or bonding between the particles and the binder. Examples of such functional additives include, but are not limited to, well-known organosilane coupling agents such as those selected from the group consisting of glycidoxyalkyl trimethoxysilanes such as gamma-glycidoxypropyl trimethoxysilane, and (aminoalkylamino) alkyl trimethoxysilanes such as 3-(2-amino ethyl amino) propyl trimethoxysilane. The alkyl groups of said coupling agents are typically $C_1$–$C_8$ groups.

Free-radical thermal initiators useful in the present invention include those oil-soluble and essentially water-insoluble initiators normally suitable for free-radical polymerization of acrylate monomers. By the term "oil-soluble" is meant that the initiator is soluble in the hydroxyl-containing monomer or monomer mixture, which has limited solubility in water. A range of known oil soluble, hydrophobic initiators for addition polymerization can be used. These species include azo compounds as well as organic peroxides, such as benzoyl peroxide and lauryl peroxide, and other thermal initiators. Examples of azo compounds include 2,2'-azobis(2-methylbutyronitrile) and 2,2'-azobis(isobutyronitrile). Commercial products of this type include VAZO 67, VAZO 64 and VAZO 52 initiators supplied by E.I. duPont de Nemours & Co. Typically about 0.1–1.0 wt-% is used based upon the total monomer weight.

Polymerization Methods

The polymeric acrylate particles of the present invention can be produced by various methods, including emulsion polymerization, dispersion polymerization, suspension polymerization, seeded polymerization, and precipitation polymerization. Such techniques are described in R. Arshady, *J. Microencapsulation,* 5, 101 (1988). Preferably, the particles are prepared by either of three generally known suspension polymerization methods, one of which uses conventional suspension agents with optional anionic surfactants, another of which ("limited coalescence method") uses a negatively charged colloidal silica suspending agent and a water-soluble promoter, and a third ("surfactant method") which employs a surfactant as a suspending agent, to produce smaller particle sizes. See, for example, U.S. Pat. Nos. 4,912,009; 4,952,650; and 5,238,736.

With respect to the first of these methods, suspension stabilizers useful in preparing the particles of the present invention are those conventionally used in suspension polymerization processes. The terms "suspension stabilizers," "suspending agents," and "suspension agents" are used interchangeably herein. They may be minimally water-soluble inorganic salts such as those selected from the group consisting of tribasic calcium phosphate, calcium carbonate, calcium sulfate, barium sulfate, barium phosphate, magnesium carbonate, and mixtures thereof. Preferred inorganic suspending agents include those selected from the group consisting of barium sulfate, tribasic calcium phosphate, and mixtures thereof. Water-soluble organic suspending agents, such as those selected from the group consisting of polyvinyl alcohol, poly-N-vinylpyrrolidone, polyacrylic acid, polyacrylamide, and hydroxyalkyl cellulose, can also be used. The suspending agent is present in an amount of about 0.01–5 wt-% based upon the total monomer weight. Surfactants can also be used in this method. Typically, artionic surfactants such as sodium lauryl sulfate and sodium dioctyl sulfosuccinate, are used. Nonionic surfactants can also be used as long as an artionic surfactant is present and predominates. The surfactant is preferably present in an amount of about 2.5 ppm (parts per million) to about 1.0 part based on 100 parts total monoomer content (i.e., 0.00025–1 wt-%).

When polymeric acrylate particles of less than one micron in diameter are desired, a surfactant or emulsifying agent alone is used as the suspending agent. Surfactants or emulsifiers useful in this "surfactant method" are typically anionic surfactants, cationic surfactants, or nonionic surfactants. Anionic surfactants useful in the present invention include, but are not limited to, the group consisting of alcohol sulfates, alkylaryl sulfonates, ethoxylated alkyl phenol sulfates, ethoxylated alkyl phenol sulfonates and mixtures thereof. Cationic surfactants include, but are not limited to, the group consisting of quaternary ammonium salts wherein at least one higher molecular weight group and two or three lower molecular weight groups are linked to a common nitrogen atom to produce a cation, and wherein the electrically balancing anion is selected from the group consisting of a halide (bromide, chloride, etc.), acetate, nitrite, and lower alkyosulfonate (methosulfate, ethyosulfate, etc.), and mixtures thereof. Nonionic surfactants useful in the present invention include, but are not limited to, the group consisting of ethoxylated alkyl phenols, ethoxylated fatty acids, and ethoxylated fatty alcohols and mixtures thereof. A combination of more than one surfactant or emulsifier is also found to be useful in the invention. For the "surfactant method," the surfactant is preferably present in an amount of about 0.2–5 wt-%, based upon the total monomer weight.

The polymeric acrylate particles of the present invention are preferably produced by the limited coalescence method (see U.S. Pat. No. 5,238,736). Typically, a reaction mixture of monomers, a negatively charged colloidal silica suspending agent (as described below), and a free-radical thermal initiator (as described above), are stirred in water under high-speed agitation conditions to break the monomer phase into small droplets. The stirred suspension is heated under nitrogen while polymerization takes place and the desired particles are formed. The particles are collected and washed with water, then dried. Preferably, about 0.3 to about 5 percent by weight of the negatively charged colloidal silica suspending agent is used, based upon the weight of the aqueous phase. The colloidal silica particles have dimensions of about 1–100 nanometers and preferably of about 5–70 nanometers. The size and concentration of these particles controls the size of the polymer particles. Smaller silica particles and higher silica concentration provides smaller bead diameters. Hydrophilic colloidal silica useful as the suspending agent is available commercially, for example, under the tradenames and in the particle sizes as follows: LUDOX TM (20 nm); LUDOX HS (12 nm); LUDOX SM (7 nm); and LUDOX AM (12 nm); all supplied by E. I. duPont de Nemours Company; and NALCO 1060 (60 nm) supplied by Nalco Chemical Company, Oakbrook, Ill.

In this preferred method, the negatively charged colloidal silica suspending agent is preferably used with a water-soluble "promoter" that affects the hydrophobic-hydrophilic balance of the colloidal particles. The components of the promoter are chosen to ensure good water solubility and sufficient complexing with colloidal silica. More specifically, the promoter forms a complex with the suspending agent which is less hydrophilic than the colloidal particles themselves. Although the inventors do not wish to be held to any particular theory, it is believed that the promoter drives the particles of the colloid to the liquid-liquid interface of the oleophilic or hydrophobic droplets and the aqueous medium. As a consequence, the complex is compatible with the hydrophobic or oleophilic monomers dispersed in the aqueous reaction medium. The complex coats the monomer droplets and inhibits their coalescence. Typically, about 0.02–0.5 percent by weight of a promoter is used based on the weight of the aqueous phase. The water-soluble promoter is preferably a low-molecular weight (i.e., about 200 to about 1000 number average molecular weight) organic condensation polymer of a lower alkylene dicarboxylic acid and an alkanol amine (preferably a mono- or dialkanol amine). The dicarboxylic acid can have an alkylene chain having about 2–6 carbon atoms in length. The preferred diacid of this class is adipic acid. The alkanol amine preferably is a lower alkanol amine of which the alkanol groups contain about 1–4 carbon atoms, selected from the group consisting of diethanolamine, 2-amino-2-ethyl-1,3-propanediol, methyl amino ethanol, N-methyldiethanolamine, N-propyldiethanolamine and N-butyldiethanolamine. With adipic acid, these alkanol amines form the polyesters (by which term we also include polyesteramides), such as poly(diethanolamine adipate) and poly(methylamino ethanol adipate). Preferably, the water-soluble promoter is a condensation polymer of adipic acid and diethanolamine.

Also desirable in the polymerization reaction mixture is an inhibitor, i.e., a water-soluble substance to prevent the emulsion or solution polymerization of the monomers in the aqueous phase. Examples of inhibitors include, but are not limited to, those selected from the group consisting of sodium nitrite, copper salts, methylene blue, potassium dichromate, phenols, and mixtures thereof. A preferred example of such a water-soluble polymerization inhibitor is potassium dichromate. Typically about 0.01–0.1 percent by weight of an inhibitor is used based on the total weight of the aqueous phase.

Specifically, the particles of the present invention are preferably prepared by first forming a mixture of water, an inhibitor of solution polymerization, e.g., potassium dichromate, a promoter, e.g., the polyester of a lower alkylene dicarboxylic acid with an amino alkanol, and the suspending agent, i.e., colloidal silica. In a separate vessel the free-radical thermal initiator is dissolved in the liquid monomer or mixture of monomers used to form the particles. The monomer or monomer mixture is then combined with the aqueous mixture in the reaction vessel with high shearing agitation to obtain a suspension of monomer droplets. The suspension is further processed with a homogenization device to reduce the size of the monomer droplets. During this time, equilibrium is reached. The size of the droplets is stabilized or limited by the suspending agent complex which coats their surfaces. The mixture is then heated and stirred in the reaction vessel to polymerize the monomer droplets. The resulting polymer particles are isolated by filtration and washed with water to remove water-soluble impurities and free suspending agent complex. Polymeric Binders The polymeric binder of the magnetic layer or the backside coating can be any suitable binder known in the art. The polymeric binder of the magnetic layer can be the same or different from the polymeric binder of the backside coating. However, due to the different demands placed on each, the polymeric binders are most commonly different from each other. Preferably, the polymeric binder of the backside coating includes functional groups that will interact, preferably chemically crosslink, to the hydroxyl groups of the particles.

Typically, the polymeric binder of either layer comprises a combination of polymers including a hard component resin, i.e., a polymer having a glass transition temperature of at least about 50° C., and a soft component resin, i.e., a polymer having a glass transition temperature below about 50° C. Examples of hard component resins suitable in the practice of the present invention include, nitrocellulose, vinyl chloride copolymers, nonhalogenated vinyl copolymers, etc. Examples of soft component resins suitable in the practice of the present invention include polyurethanes, polyesters, polyureas, etc. The weight ratio of the hard component resin to the soft component resin is about 0.05–19 to 1, preferably about 0.2–5 to 1, and more preferably about 0.5–2 to 1. In other instances, the polymeric binder of the magnetic layer can be prepared from only a single polymer.

Optionally, one or more polymers of the polymeric binder of either layer can have one or more functional groups, either pendant from or incorporated into the polymer backbone, to enhance the performance of the magnetic recording medium. For example, such polymer or polymers can contain carbon-carbon double bonds and/or hydroxyl groups to facilitate crosslinking. Preferably, at least one polymer component includes pendant hydroxyl groups. The hydroxyl groups not only facilitate crosslinking, but they promote the dispersion of the magnetic and nonmagnetic pigments/particles in the binder, promote the solubility of the polymer in solvents, and promote the compatibility of the polymer with other polymers. The hydroxyl groups can be primary, secondary, or tertiary, although the use of primary and/or secondary hydroxyl groups is preferred. Generally, preferred hydroxyl functional polymers have an OH equivalent weight of about 200–20,000, preferably about 300–5000.

Additionally, such polymer or polymers can contain one or more kinds of pendant dispersing groups to help disperse, i.e., wet, the magnetic pigment, or nonmagnetic particles, in the polymeric binder. Preferably these dispersing groups are ionized or ionizable at a pH of about 2–10. Representative examples of suitable dispersing groups include quaternary ammonium moieties, amines, heterocyclic moieties as described in U.S. Pat. No. 5,081,213, sulfobetaines (e.g., $-N^+(CH_3)_2(CH_2CH_2CH_2SO_3^-)$) as well as sulfate, sulfonate, phosphate, phosphonate, or carboxylate salts or acids. As a result of using such dispersing groups, less dispersant or wetting agent (or even no dispersant or wetting agent) can be used to help disperse the magnetic or nonmagnetic particles in the binders. Examples of other polymeric binders containing polymer components having pendant dispersing groups are disclosed in U.S. Pat. No. 5,185,423 and British Application No. 93-20711, filed on Oct. 7, 1993.

In those instances wherein the polymer or polymers of the polymeric binder include pendant or terminal hydroxyl groups, the polymeric binder can further include an isocyanate crosslinking agent to facilitate crosslinking of the hydroxyl groups (either within the polymer or between the polymer and the particles). The isocyanate crosslinking agent is preferably a polyfunctional isocyanate having an average functionality of at least about two isocyanate groups per molecule. The isocyanate crosslinking agent is preferably used in an amount such that the molar ratio of —NCO groups relative to the total number of hydroxyl groups in the binder is preferably about 0.3–3.0 to 1, and more preferably about 0.9–2.5 to 1.

Optionally, a catalyst, such as dibutyltin dilaurate or a tertiary amine, can be used in suitable catalytic amounts to facilitate the crosslinking reaction. With certain preferred polyisocyanate crosslinking agents, however, crosslinking is sufficiently fast that catalysts are not required to cure the coatings.

Backside Coatings

In addition to the claimed particles and the polymeric binder, backside coatings of the present invention can optionally include various additives to enhance the performance of the backside coating. The use of such additives is well known in the art and includes, for example, lubricants, antioxidants, surfactants, fungicides, bactericides, antistatic agents, coloring agents, catalysts, crosslinkers, wetting agents, thermal stabilizers, coating aids, other nonmagnetic pigments, wetting agents, i.e., dispersants, and the like, in accordance with practices known in the art.

The polymeric acrylate particles can be present in any amount sufficient to provide enhanced frictional properties of a backside coating. If too few particles are added, the backside surface will remain too flat, and little or no improvements will be achieved. However, using too many backside particles has been known to cause undesired performance problems, e.g., increased bit error rate due to embossing of the magnetic layer. The optimum amount may vary depending upon many factors, including the specific media formats involved (e.g., digital video tape, computer tape, audio tape, and the like), the speed at which the media is run, the nature and hardness of the guide rolls and guide pins within a recording/playback device, the wrap angle of the medium around guide rolls and guide pins, and to a lesser degree, the interface between the medium and the recording and playback heads. Therefore, for different media, and different formats of media, the optimum level of particles may be different.

Generally, useful amounts of polymeric acrylate particles of the present invention are amounts up to about 2.0 parts by weight (pbw), based on 100 parts backside coating. In one embodiment particularly suited for use in computer cartridge tape, the preferred amount of polymeric acrylate particles is about 0.2–1.0 pbw based on 100 parts backside coating weight, and the more preferred amount is about 0.2–0.5 pbw.

Other factors also contribute to the effectiveness of the polymeric particles in backside coatings. For example, the size of the particles in a backside coating, the roughness of the backside, and/or the ratio of particle size to backside coating caliper may affect the running properties of a magnetic recording medium. In the practice of the present invention, particle size means the mean particle size. It can be measured by a MICROTRAC II Particle Size Analyzer, commercially available from Leeds & Northrup Co. (Miami, Fla.). The MICROTRAC II Particle Size Analyzer determines the volume of the particles, and expresses this measurement in terms of a representative mean particle size (diameter), in microns.

The roughness of a backside coating has been found to be a major factor in affecting the frictional and running properties of a magnetic recording medium. A moderately rough backside coating is preferred. A moderately rough backside surface will decrease the contact area between the magnetic recording medium and guide surfaces in the recording/playback device, thereby resulting in reduced friction between these surfaces. However, too rough of a backside coating can cause a new set of problems. For instance, a rough backside might cause defects in the magnetic side of the medium due to embossing. Further, evaluations have shown that excessively rough backside coatings can result in running properties that are inferior to backside coatings containing no particulate filler at all. Therefore, an optimum backside coating roughness is a surface rough enough to decrease the contact area between the medium and internal mechanisms of a recording/playback apparatus, but not so rough that other running properties are adversely affected.

In the practice of the present invention, roughness (Rq) of the backside coating can be measured by a Wyko Laser Interferometer, commercially available from Wyko Corp. (Tuscon, Ariz.). Generally, useful backsides may have roughness values up to 60 nm Rq. However, the optimal roughness of backside coating depends upon various factors and will be different for different media and formats. In one embodiment particularly suited for use in computer cartridge tape, the roughness value is preferably about 10–60 nm Rq, preferably about 10–40 nm Rq.

The ratio of mean particle size to backside coating caliper can affect the running properties of backside coatings of the present invention. While not wishing to be bound by theory, polymeric acrylate particles in a backside coating are thought to be useful in that they create a controlled roughness of the backside by causing protrusions of the underlying polymer coating. These protrusions act as load bearing surfaces. In relation to the depth of the backside coating, the polymeric acrylate particles are preferably of a size large enough to barely protrude from the surface of the coating. If the thickness of the coating is much larger than the diameter of the particles, the particles will be buried, and consequently may be less effective. If the polymer coating is too shallow in relation to the size of the particles, major portions of the individual particles will protrude from the coating. In this case, many negative effects are possible. The protruding particles can cause embossing of a magnetic recording tape's magnetic coating, or can transfer to the magnetic coating. In either case, dropouts could result, leading to poor cleanliness values and unstable frictional properties; although, the particles of the present invention are designed to improve particle anchorage to the binder. In consideration of the above factors, a preferred ratio of average particle size to backside coating thickness is about 0.75–1.25 to 1, and more preferably, the mean particle size is substantially equal to the thickness of the backside coating.

In addition to polymeric particles of the present invention, nonmagnetic pigments can be used to improve durability and conductivity of the coating. Nonmagnetic pigments that are useful include carbon black and inorganic nonmagnetic pigment(s), i.e., powder(s), such as $Al_2O_3$, $TiO_2$, $Fe_2O_3$, and the like. The carbon black particles included in the preferred backside coating provide opacity and increase the conductivity of the coating. The inorganic nonmagnetic pigment included in the preferred backside coating provide improved durability. Preferred such inorganic nonmagnetic particles have a Mohs hardness of greater than about 4, and more preferably greater than about 7. The preferred inorganic nonmagnetic pigment is alumina, particularly alumina having an average particle size of less than about 1 µm, more preferably an average particle size of about 0.5 µm. Particles of this size, however, generally do not provide sufficient texture if used alone. Carbon black can be used in a wide variety of particle sizes, with the larger material providing some, although generally insufficient, texture. The amount of such pigment(s) used can vary, but is preferably about 30–60 pbw and more preferably about 45–50 pbw, based on 100 parts backside coating. In one preferred embodiment, the backside coating includes carbon black and $Al_2O_3$ particles in addition to the binder component and nonmagnetic particles.

Optionally a wetting agent, i.e., dispersant, or combination of several different wetting agents, can be added to the backside coating to help disperse the carbon black, alumina, and polymeric acrylate particles. A variety of wetting agents can be used in the present invention. Examples of suitable wetting agents include EMCOL phosphate, EMCOL acetate, phosphorylated polyoxyalkyl polyols, lecithin, polymers bearing dispersing groups, and the like.

Preparation of Magnetic Media

To form the magnetic layer or the backside coating, the components are combined and mixed with a suitable solvent to form a substantially homogeneous dispersion. Useful solvents are those that are capable of dispersing the polymeric binder and magnetic or nonmagnetic particles, and that evaporate upon heating to leave behind the dried coating. Such solvents include, for example, toluene, methyl ethyl ketone (MEK), tetrahydrofuran (THF), cyclohexanone (CHO), methyl isobutyl ketone (MIBK), xylene, or combinations thereof. For the purposes of the present invention, the solvent includes all solvents that are part of the dispersion, whether added as a solvent with another ingredient, or added separately.

To prepare the dispersion, the ingredients are combined and milled until a substantially smooth dispersion is obtained. In the case of the backside coating, milling time has been observed to affect the surface roughness of the resulting backside coating. Generally, a longer milling time provides a smoother coating. For example, milling the backside dispersion in a horizontal sand mill for about 6–12 passes has been found to be effective.

After the dispersion has been prepared, it is coated onto a major surface of the nonmagnetic support, which may be primed or unprimed. Just prior to coating, the crosslinking agent (and catalyst, if used) are blended into the dispersion. The backside and magnetic dispersions can be applied to the support in any order and by any conventional coating method, such as, for example, gravure coating techniques, modifications of gravure coating techniques, knife coating techniques, curtain coating techniques, hydro-pneumatic coating techniques, and the like. The backside and magnetic dispersions can be coated at various thicknesses, with useful dry caliper values being about 0.5–1.5 µm, and a caliper of about 1.0–1.25 µm being preferred. The coated support is then passed through a drier, calendered if desired, and allowed to cure at room temperature (i.e., 20°–30° C.) and humidity or with a heat soak at elevated temperatures (e.g., 100°–150° F. or 38°–66° C.). The coated magnetic dispersion is typically passed through a magnetic field to orient (or randomize), the magnetic pigment prior to drying, calendering, and curing.

Curing of the backside coating and/or magnetic layer can be accomplished in a variety of ways. For example, if an isocyanate crosslinking agent is used, it can be added to the dispersion just before the dispersion is coated onto the support. As soon as the isocyanate crosslinking agent is added to the dispersion, the —NCO groups of the isocyanate crosslinking agent will begin to react with the hydroxyl groups, if any, of the polymeric binder. If desired, a catalyst, e.g., dibutyltindilaurate, can also be added to facilitate this crosslinking reaction. If radiation curable materials are used in either the backside coating or magnetic layer, the dried coating can be exposed to a suitable source of radiation, e.g., electron beam radation or ultraviolet radiation.

Objects and advantages of this invention are further illustrated by the following examples. The particular materials and amounts thereof recited in these examples as well as other conditions and details, should not be construed to unduly limit this invention. All materials are commercially available except where stated or otherwise made apparent.

EXAMPLES

The following nonlimiting examples include exemplary preparations of the particles of the invention. All parts, percentages, ratios, etc., herein and in the rest of the specification are by dry weight of the coating unless otherwise specified.

Preparation of Caprolactone Acrylate-Hexanediol Diacrylate Particles

An aqueous mixture of 751 g deionized water, 101 g Ludox SM-30 (a colloidal silica dispersion, available from E.I. duPont de Nemours & Co.), and 5.5 g of a 50% solution of diethanol-adipic acid condensate (as promoter) was stirred in a glass jar and the mixture was adjusted to a pH of 4 by addition of 10% sulfuric acid. A monomer solution of 88.4 g caprolactone acrylate obtained from Sartomer Co. (Exton, Pa.), 354 g 1,6-hexandiol diacrylate, and 2.1 g VAZO 64 initiator (2,2'-azobis(isobutyronitrile)), available from E.I. duPont de Nemours & Co. was prepared separately. The aqueous mixture and the monomer solution were poured into a 5-liter split resin flask equipped with a marine-propeller type stirrer and mixed at about 1500 rpm (revolutions per minute) for 2 minutes. The mixture was then poured out of the flask and passed through a Manton-Gaulin Homogenizer available from the APV Gaulin Inc. (Everett, Mass.) at 700–900 psi (pounds per square inch, $4.8 \times 10^6$–$6.2 \times 10^6$ Pascals) three times. The homogenized suspension was returned to the resin flask. The content was heated with infrared lamps to 60° C. under a nitrogen blanket and agitated at about 500 rpm (revolutions per minute) for 15 hours. A stable suspension of polymer particles was obtained. Analysis with Coulter N4 submicron particle size analyzer, available from Coulter Electronic Inc. (Hinleah, Fla.) showed an average particle size of 1.1 microns. The suspension was filtered with Whatmann #54 filter paper on a 24-cm Büchner funnel and washed several times with deionized water to give a wet cake. The wet cake was placed on glass trays and dried at ambient condition for several days. The dry cake was put in a gallon glass jar along with glass marbles and placed on a roller for several days to give free-flowing powder (average particle size=1.1 microns).

Preparation of Samples

To evaluate durability and extent of debris of backside coatings containing the polymeric acrylate particles, four backside formulations (Sample 1, Sample 2, Control 1, Control 2), were all prepared in the same basic manner. In each formulation, the polymeric acrylate particles (Samples 1 and 2 only), carbon, and alumina powders were prepared as separate dispersions, then blended before gravure coating. The formulations are as follows:

| Charge | Ingredients | Parts by weight solids | | | |
|---|---|---|---|---|---|
| | | Sple 1 | Sple 2 | Ctrl 1 | Ctrl 2 |
| Particle Charge | Polymeric Acrylate Particles (prepared as described above) | 0.5 | 0.5 | | |
| | Phosphorylated Polyoxyalkylpolyol Wetting Agent (75% solids in toluene,** material is described in U.S. Pat. No. 5,028,483, col. 5, lines 32–45) | 0.01 | 0.01 | | |
| | EMCOL Phosphate Wetting Agent from Witco Chemical Corp., Houston, TX October 11, 1994 (100% solids) | 0.01 | 0.01 | | |
| | MEK | (0.02)* | (0.02)* | | |
| | Toluene | (0.001)* | (0.001)* | | |
| Main Charge | Vulcan XC-72 Carbon Black from Cabot Corp., Kokoma, IN (29 nm) | 41.2 | 37.5 | 41.4 | |
| | Regal 660R Carbon Black from Cabot Corp., Kokoma, IN (24 nm) | | | | 33.1 |
| | Thermax N-991 Medium Thermal Carbon Black from Cancarb Ltd., Medicine Hat, Alberta, Canada (270 nm) | | | | 8.3 |
| | Hard Resin FM200S Cellulose Nitrate from Daicel Chemical Industries, Tokyo, Japan (25% in MEK/CHO 9/1, Tg = 160° C.) | 14.4 | | 14.5 | 14.5 |
| | Hard Resin EC-130 Vinyl Chloride Acrylate Copolymer from Sekisui Chemical, Co., Tokyo, Japan (20% in MEK) | | 21.3 | | |
| Main Charge (cont) | Soft Resin UR-8700 Sulfonated Aliphatic Polyester from Toyobo Co., Tokyo, Japan (30% in MEK) | 28.7 | | 28.8 | 28.8 |
| | Soft Resin MSA-HPU Mercaptosuccinic Acid Polyurethane (40% in MEK, material is described in U.S. Pat. application Ser. | | 21.4 | | |

| | | | | | |
|---|---|---|---|---|---|
| | No. 08/054511, filed April 27, 1993) | | | | |
| | MEK | (11.8)* | (14.7)* | (11.8)* | (11.8)* |
| | Toluene | (3.0)* | (6.3)* | (3.0)* | (3.0)* |
| Alumina Charge | Ceralox APA 0.4 μm Alumina Powder from Ceralox Corp., Tuscon, AZ | 7.7 | 7.4 | 7.7 | 7.7 |
| | Phosphorylated Polyoxyalkylpolyol Wetting Agent (75% in toluene, material is described in U.S. Pat. No. 5,028,483, col. 5, lines 32–45)) | 0.2 | 0.2 | 0.2 | 0.2 |
| | EMCOL Phosphate Wetting Agent from Witco Corp. (100% solids) | 0.2 | 0.2 | 0.2 | 0.2 |
| | HPU 21853 Polyether Urethane (41% in MEK, material is described in U.S. Pat. No. 4,837,082) | 0.2 | 0.2 | 0.2 | 0.2 |
| Alumina Charge (cont) | VAGH Vinyl Chloride Copolymer Resin from Union Carbide (32% in MEK) | 0.1 | 0.1 | 0.1 | 0.1 |
| | RJ-100 Styrene-Allyl Alcohol Copolymer from Monsanto Co., St. Louis, MO (30% in MEK) | 0.2 | 0.2 | 0.2 | 0.2 |
| | MEK (methyl ethyl ketone) | (0.7)* | (0.7)* | (0.7)* | (0.7)* |
| | Toluene | (0.2)* | (0.2)* | (0.2)* | (0.2)* |
| | CHO (cyclohexanone) | (0.2)* | (0.2)* | (0.2)* | |
| Activation Charge | CB701 Isocyanate Crosslinking Agent from Miles, Inc., New Martinsville, WV (70% in THF) | | 10.3 | | |
| | Isocyanate Crosslinking Agent, a film-forming unhindered, aromatic polyisocyanate (60% in propylene glycol monomethyl ether acetate, material is disclosed in U.S. Pat. application Ser. No. 08/085,189) | 6.6 | | 6.7 | 6.7 |

*Denotes a 100% solvent component added to the dispersion (numbers indicate weight percentages of solvents used based on the total composition weight).
**Although the reagents listed in this table are often listed as being in a solvent, the parts by weight are by weight of the dry coating weight.

Polymeric Particle Charge

The polymeric acrylate particles, wetting agents, i.e., dispersants, and solvents listed above were mixed together using a small air motor mixer with a shar type mixing blade. After two hours of mixing, the MICROTRAC average (MV) particle size was found to be 1.49 microns. Particle stability (swelling) was checked after two months. A MICROTRAC average (MV) reading of 1.48 microns indicated that no swelling or reagglomeration of polymeric acrylate particles had occurred.

Main Charge (Carbon)

Carbon black powder was premixed in the solution of solvents and polymers listed above for 3.5 hours with a high speed shar mixer. The 21% solids premix was then milled in a Netzsch horizontal sandmill with 1.3 mm ceramic media at 1400 rpm shift speed and a flow rate of 0.07 gallon per minute (0.26 liter per minute). About 8–9 mill passes were required for proper smoothness, which was determined with a light microscope by smearing a drop of dispersion on a glass slide and observing at 200× magnification with transmitted light. Finally, the dispersion was thinned to 16% solids for coating.

Alumina Charge

The alumina powder was premixed with the solvents, dispersants, and polymers listed above for 3 hours on a high speed shar mixer. The milling conditions for the alumina were the same as the conditions used for the carbon charge. A final dispersion smoothness of 0.46 micron (MV) for the alumina was determined by a MICROTRAC II Particle Size Analyzer.

Dispersion Preparation and Coating

The carbon, alumina, and polymeric particle dispersions were shar mixed together prior to coating. If required, additional solvent was added for final solids adjustment to about 16–20%, preferably about 17–18%. The dispersion blend was filtered through Nippon Roki filters, the activator, i.e., isocyanate crosslinker, was added with shar mixing, and another filtration step was performed. Coating was done on a rotogravure coater. Standard coating and calendering conditions were used [calendering: 100°–140° F. (38°–60° C.) and 1000–2000 psi ($6.9 \times 10^6$ to $1.4 \times 10^7$ Pascals); coating and curing: 250 feet per minute (76.2 meters per minute), 140° F. (60° C.) oven temperature]. All media were slit to ¼ inch (0.64 cm) wide.

Test Results

Test results were generated on a ¼ inch (0.64 cm) data cartridge accelerated wear tester. This test fixture simulates the tape path in a ¼ inch (0.64 cm) data cartridge drive using rollers, guide pins, and a recording head. Tape tension was set at 2.5 ounces (71 grams) and tape speed was 120 inches (305 cm) per second. The tape sample was 45 inches (114 cm) long with the ends spliced together to form a loop. The test was performed at a tape speed of 120 inches (305 cm) per second at about 72° C. and 50% relative humidity for 10,000 passes. The relative humidity was increased to 80% and an additional 6,000 passes were run.

Figure 1:
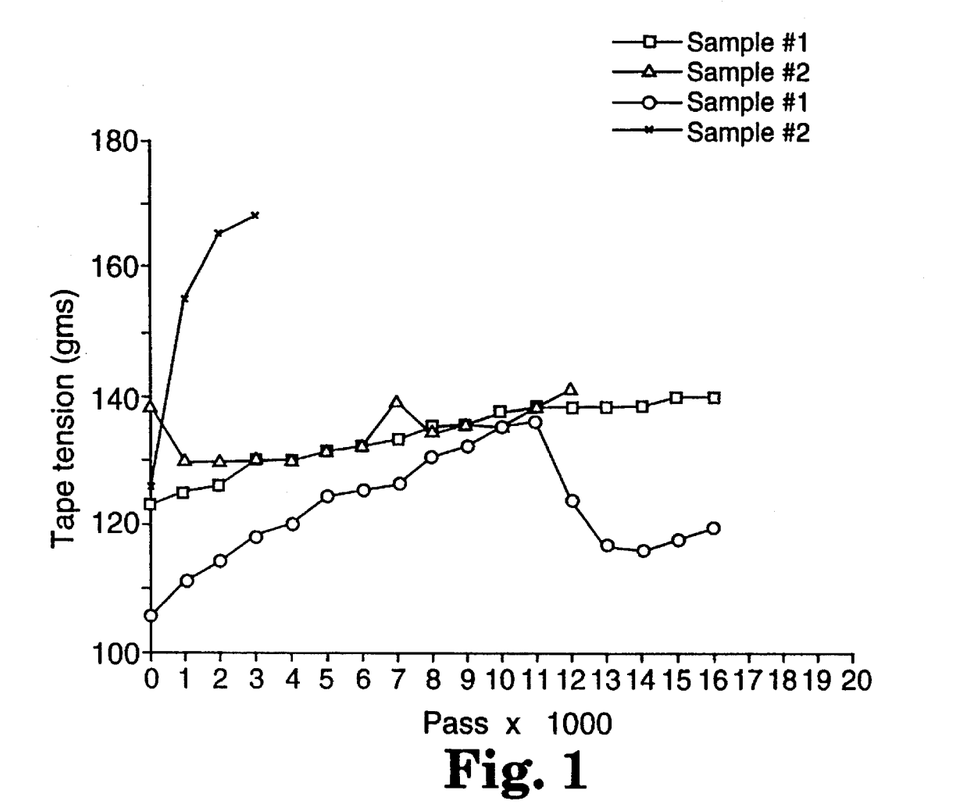
FIG. 1 is a graph of tape tension vs. number of passes as measured by a test fixture that simulates the tape path in a ¼ inch (0.64 cm) data cartridge drive.

Tape tension, durability, and amount of debris were evaluated. When compared to a backside coating with no texture (Control #1, no polymeric acrylate particles, average 35.87 nm Rq as measured by a Wyko Laser Interferometer), or to a backside coating with all carbon texture (Control #2, no polymeric acrylate particles, average 18.98 nm Rq), the backside coating of the present invention containing polymeric acrylate particles (Sample 1, average 36.38 nm Rq, and Sample 2, average 26.49 nm Rq) had superior performance. The results are shown in FIG. 1 and Table 1. Samples 1 and 2 had very stable tape tension relative to the controls. Control 1 was less stable with increasing tension out to 10,000 passes, then a major fluctuation occurred with increased humidity. Control 2 failed the test after only 3,000 passes.

The backside cleanliness of the tape was evaluated by wiping the test fixture heads. The cleanliness of the backside was rated according to the amount of debris collected in the wipe.

Air bleed, as measured by an air bleed tester, measures the rate at which air can escape from the backside coating, and is related to the backside surface texture. Lower air bleed values indicate more surface texture. With a lower air bleed value, wind quality of the tape improves and the tape can be processed and used at a faster speed. The air bleed tester used for the present invention holds a magnetic recording tape in contact with a flat surface, the surface having grooves for exposing different areas of the tape to different air pressures. The air bleed test measured the time required for air to flow from an area of the tape exposed to atmospheric pressure, the air penetrating between the tape and the flat surface, and flowing to an area of the tape that was exposed to a reduced pressure. The time measured was the time required for the reduced pressure to recover to a preset pressure.

TABLE 1

| | Air Bleed Times (seconds) | |
|---|---|---|
| | Before Wear | After Wear |
| Sample 1 | 250 | 375 |
| Sample 2 | 213 | — |
| Control 1 | 757 | 1100 |
| Control 2 | 500 | 1216 |

As shown in FIG. 1, the backside coating of the present invention (Sample 1) had low tape tension that remained stable throughout the life of the test (16,000 passes). As shown by the data in Table 1, short air bleed times remained stable after 16,000 passes. The stable tension and air bleed indicated good durability with no significant physical change on the backside surface. Almost no debris was collected off the test fixture heads, a further indication of good durability.

A second backside coating containing the particles of the present invention but in a different binder system (Sample 2) had very similar tape tension results when compared to Sample 1 until the tape sample broke (12,000 passes) at which point the test was stopped. Initial air bleed was low. No data was collected for final air bleed due to the broken sample. Little debris was collected off the test fixture heads.

The backside coating with no texture (Control 1) had low tape tension initially, but showed a notable increase with time. Air bleed time was long and increased after 16,000 passes. Little debris was collected off the test fixture heads. The all carbon textured backside coating (Control 2) ranked lowest in all tests. Tape tension started out low but increased dramatically after only 3,000 passes. Air bleed also increased significantly with time. Excessive debris was collected off the test fixture heads.

Thus, the compositions of the present invention performed well in tests that simulated use in data cartridges, wherein there are a low number of guides and heads (5-3 of which contact the backside), with a short tape path. In tests that simulated use in D2 video decks, wherein there are a large number of guides and heads (17-7 of which contact the backside), with a longer tape path, the compositions represented by Samples 1 and 2 showed capstan voltages (a measure of drag and friction) that increased with each pass.

While this invention has been described in connection with specific embodiments, it should be understood that it is capable of further modification. The claims herein are intended to cover those variations which one skilled in the art would recognize as the chemical equivalent of what has been described herein. Thus, various omissions, modifications, and changes to the principles described herein may be made by one skilled in the art without departing from the true scope and spirit of the invention which is indicated by the following claims.

What is claimed:

1. A magnetic recording medium comprising a support having two major surfaces, a magnetic layer provided on one major surface of the support, and a backside coating provided on the other major surface of the support, wherein the backside coating comprises nonmagnetic particles dispersed in a polymeric binder; the particles having a mean particle size of 0.5 to 5.0 μm and comprising a copolymer of:

(a) about 50–98 parts by weight of at least one polymerizable di(meth)acrylate monomer of the formula:

$$CH_2=CR^1C(O)O-X-O(O)CCR^1=CH_2$$

wherein each $R^1$ is independently H or $CH_3$ and X is a divalent branched or unbranched aliphatic or aromatic linking group; and (b) about 2–50 parts by weight of at least one polymerizable hydroxyl-containing monomer.

2. The magnetic medium of claim 1 wherein the hydroxyl-containing monomer is selected from the group consisting of a hydroxyl-containing alkyl acrylate, hydroxyl-containing alkyl methacrylate, caprolactone acrylate, caprolactone methacrylate, hydroxyl-containing acrylamide, hydroxyl-containing methacrylamide, hydroxyl-containing styrene derivative, hydroxyl-containing vinyl ethers, hydroxyl-containing allyl ether, poly(alkylene glycol) acrylate, poly(alkylene glycol) methacrylate, allyl alcohol, and mixtures thereof.

3. The magnetic medium of claim 2 wherein the hydroxyl-containing monomer is a hydroxyl-containing acrylate or methacrylate.

4. The magnetic medium of claim 3 wherein the hydroxyl-containing monomer is a hydroxyl-containing acrylate or methacrylate of the formula $$CH_2=CR^2C(O)OR^3,$$

wherein $R^2$ is H or $CH_3$, and $R^3$ is a hydroxyl-containing moiety.

5. The magnetic recording medium of claim 4 wherein $R^3$ is a hydroxyl-substituted alkyl group containing 2–10 carbon atoms.

6. The magnetic recording medium of claim 5 wherein the hydroxyl-containing acrylate or methacrylate is selected from the group consisting of 3-hydroxypropyl (meth)acrylate, 4-hydroxybutyl (meth)acrylate, 2-hydroxybutyl (meth)acrylate, 2-hydroxypropyl (meth)acrylate, and 5-hydroxypentyl (meth)acrylate.

7. The magnetic recording medium of claim 1 wherein the polymeric particles further include about 5–35 parts by weight of at least one polymerizable ethylenically unsaturated monomer selected from the group consisting of a vinyl ester, acrylic ester, methacrylic ester, styrene, vinyl toluene, alpha-methyl styrene, and mixtures thereof.

8. The magnetic recording medium of claim 1 wherein the copolymer of the particles further include about 5 to 30 parts by weight of a polymerizable acrylate or methacrylate monomer represented by the formula:

$$CH_2=CR^{16}C(O)OC_wH_{2w+1}$$

wherein $R^{16}$ is H or $CH_3$ and w is an integer from 12 to 40.

9. The magnetic medium of claim 1 wherein the di(meth)acrylate is selected from the group consisting of 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetradecanediol di(meth)acrylate, and mixtures thereof.

10. The magnetic medium of claim 9 wherein the di(meth)acrylate is selected from the group consisting of 1,4-butanediol di(meth)acrylate, 1,6-hexanediol di(meth)acrylate, 1,12-dodecanediol di(meth)acrylate, 1,14-tetradecanediol di(meth)acrylate, and mixtures thereof.

11. A magnetic recording medium comprising a support having two major surfaces, a magnetic layer provided on one major surface of the support, and a backside coating provided on the other major surface of the support, wherein the backside coating comprises nonmagnetic particles dispersed in a polymeric binder; the particles having a mean particle size of 0.5 to 5.0 μm and comprising a copolymer of:

(a) about 50–98 parts by weight of at least one polymerizable di(meth)acrylate monomer of the formula:

$$CH_2=CR^1C(O)OC_nH_{2n}O(O)CCR^1=CH_2$$

wherein $R^1$ is H or $CH_3$, and n is an integer from 4 to 18; and (b) about 2–50 parts by weight of at least one polymerizable hydroxyl-containing monomer selected from the group consisting of a hydroxyl-containing alkyl acrylate, hydroxyl-containing alkyl methacrylate, caprolactone acrylate, caprolactone methacrylate, hydroxyl-containing acrylamide, hydroxyl-containing methacrylamide, hydroxyl-containing styrene derivative, hydroxyl-containing vinyl ether, hydroxyl-containing allyl ether, poly(alkylene glycol) acrylate, poly(alkylene glycol) methacrylate, allyl alcohol, and mixtures thereof.

12. The magnetic recording medium of claim 11 wherein the hydroxyl-containing monomer is a poly(alkylene glycol)(meth)acrylate of the formula:

$$CH_2=CR^6C(O)O(C_2H_4O)_p(C_3H_7O)_qH$$

wherein $R^6$ is H or $CH_3$, p and q are integers such that p+q=2–15.

13. The magnetic recording medium of claim 11 wherein the hydroxyl-containing monomer is a hydroxyl-containing (meth)acrylamide of the formula:

$$CH_2=CR^7CONR^8R^9$$

wherein $R^7$ is H, $CH_3$, or halogen; and $R^8$ and $R^9$ are each independently H, a cyclic, branched, or straight chain alkyl group containing 1–12 carbon atoms, or a hydroxyl-substituted cyclic, branched, or straight chain alkyl group containing 1–12 carbon atoms, with the proviso that at least one of $R^8$ or $R^9$ is a hydroxyl-substituted alkyl group.

14. The magnetic recording medium of claim 11 wherein the hydroxyl-containing monomer is a hydroxyl-containing styrene derivative of the formula:

$$CH=CH_2-R^{10}-OH$$

wherein $R^{10}$ is a substituted or unsubstituted benzene or benzyl group.

15. The magnetic recording medium of claim 11 wherein the hydroxyl-containing monomer is an allyl alcohol of the formula:

$$CH_2=CR^{11}C(OH)R^{12}R^{13}$$

wherein $R^{11}$ is H, methyl, ethyl, or halogen; and $R^{12}$ and $R^{13}$ are each independently H, a cyclic, branched, or straight chain alkyl group containing 1–12 carbon atoms, or phenyl.

16. The magnetic recording medium of claim 11 wherein the hydroxyl-containing monomer is a vinyl ether of the formula:

$$CH_2=CHOR^{14}$$

wherein $R^{14}$ is a hydroxyl-containing cyclic, branched, or straight chain alkyl group containing 1–12 carbon atoms.

17. The magnetic recording medium of claim 11 wherein the hydroxyl-containing monomer is a hydroxyl-containing allyl ether of the formula:

$$CH_2=CHCH_2OR^{15}$$

wherein $R^{15}$ is a hydroxyl-containing cyclic, branched, or straight chain alkyl group containing 1–12 carbon atoms, or a phenyl group.

18. The magnetic recording medium of claim 11 wherein the hydroxyl-containing monomer is a hydroxyl-containing caprolactone (meth)acrylate of the formula:

$$CH_2=CR^4C(O)OCH_2CHR^5O\{C(O)(CH_2)_5O\}_mH$$

wherein $R^4$ and $R^5$ are each independently H or $CH_3$ and "m" is an integer from 1 to 10.

19. A magnetic recording medium comprising a support having two major surfaces, a magnetic layer provided on one major surface of the support, and a backside coating provided on the other major surface of the support, wherein the backside coating comprises nonmagnetic particles dispersed in a polymeric binder; the particles having a mean particle size of 0.5 to 5.0 μm and comprising a copolymer of:

(a) about 50–98 parts by weight of at least one polymerizable di(meth)acrylate of the formula:

$$CH_2=CR^1C(O)OC_nH_{2n}O(O)CCR^1=CH_2$$

wherein $R^1$ is H or $CH_3$, and n is an integer from 4 to 18; and (b) about 2–50 parts by weight of at least one hydroxyl-containing (meth)acrylate monomer of the formula $CH_2=CR^2C(O)OR^3$, wherein $R^2$ is H or $CH_3$, and $R^3$ is a hydroxyl-containing moiety.

* * * * *